United States Patent [19]

Araki

[11] 4,268,129
[45] May 19, 1981

[54] MIRROR FOR OPTICAL RECORDING SYSTEM

[75] Inventor: Yositugu Araki, Tokorozawa, Japan

[73] Assignee: Universal Pioneer Corporation, Tokyo, Japan

[21] Appl. No.: 50,859

[22] Filed: Jun. 21, 1979

[30] Foreign Application Priority Data

| Jun. 21, 1978 | [JP] | Japan | 53-75193 |
| Aug. 17, 1978 | [JP] | Japan | 53-100340 |
| Aug. 17, 1978 | [JP] | Japan | 53-100341 |
| Aug. 17, 1978 | [JP] | Japan | 53-100342 |
| Aug. 17, 1978 | [JP] | Japan | 53-100343 |
| Aug. 17, 1978 | [JP] | Japan | 53-100344 |
| Aug. 17, 1978 | [JP] | Japan | 53-100345 |
| Aug. 17, 1978 | [JP] | Japan | 53-100346 |
| Aug. 17, 1978 | [JP] | Japan | 53-100347 |
| Aug. 17, 1978 | [JP] | Japan | 53-100348 |
| Aug. 17, 1978 | [JP] | Japan | 53-100349 |

[51] Int. Cl.³ .................................... G05D 25/00
[52] U.S. Cl. ................................ 350/486; 350/6.6; 369/119
[58] Field of Search .............. 350/6.5, 6.6, 285; 179/100.3 V

[56] References Cited

U.S. PATENT DOCUMENTS

| 4,074,312 | 2/1978 | van Rosmalen | 350/285 X |
| 4,175,832 | 11/1979 | Umeki et al. | 350/6.6 X |
| 4,187,452 | 2/1980 | Knappe et al. | 350/6.6 X |

FOREIGN PATENT DOCUMENTS 635099 9/1936 Fed. Rep. of Germany ...... 350/285

Primary Examiner—F. L. Evans
Attorney, Agent, or Firm—Sughrue, Rothwell, Mion, Zinn and Macpeak

[57] ABSTRACT

A movable mirror device for an optical information recording and reproducing system has a base portion with a bottom section and an up-standing section extending from the bottom section. A permanent magnet having opposite magnetic poles at opposite ends thereof is fixedly mounted on the bottom section of the base portion. A pair of yokes have their ends engaged with opposite ends of the magnet, respectively. A plate member is supported by the up-standing section of the base portion disposed between the other ends of said yokes and a movable portion having a core. A mirror substrate is supported by an end plate formed on one end of the core and a mirror is fixed to the mirror substrate. A supporting portion provided on the other end of said core pivotally supports the core with respect to the up-standing section and a coil portion is wound around the mirror substrate. The movable portion is disposed such that the coil portion of the movable portion is disposed in a magnetic field formed in gaps between the plate member and the other ends of the yokes.

15 Claims, 15 Drawing Figures

F I G. 12
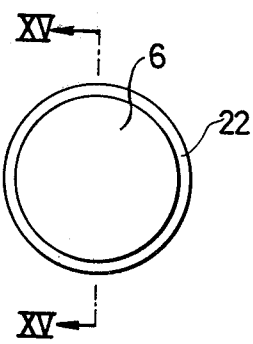
F I G. 13
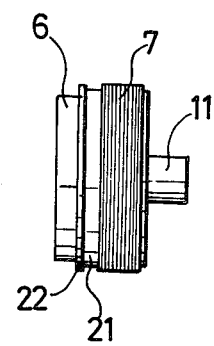
F I G. 14
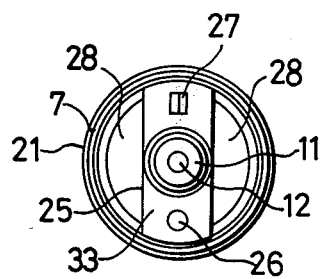
F I G. 15
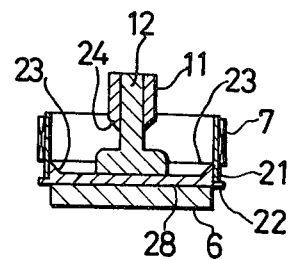

MIRROR FOR OPTICAL RECORDING SYSTEM

BACKGROUND OF THE INVENTION

The present invention relates to a disc type optical information recording and reproducing apparatus. More particularly it relates to a movable mirror device for use in the apparatus of the type for reflecting a light such as a laser beam in a desired optical axis direction.

The conventional movable mirror device utilizes a movable permanent magnet disposed in a magnetic field produced by a stationary coil portion and a mirror bonded onto a surface of the permanent magnet. In the movable mirror device of this type, however, an important disadvantage is inherent in that an external magnetic field may be produced by a driving device for an objective lens for focussing the laser beam on a disc surface. This is apt to affect the movable mirror device.

SUMMARY OF THE INVENTION

An object of the present invention is to provide an improved movable mirror device which eliminates the disadvantages of the conventional movable mirror device.

It is another object of this invention to provide a mirror device that is accurate in alignment yet easily used and maintained.

These and other objects of this invention are accomplished by a movable mirror device for an optical information recording and reproducing system having a base portion with a bottom section and an up-standing section extending from the bottom section. A permanent magnet having opposite magnetic poles at opposite ends thereof is fixedly mounted on the bottom section of the base portion. A pair of yokes have their ends engaged with opposite ends of the magnet, respectively. A plate member is supported by the up-standing section of the base portion disposed between the other ends of said yokes and a movable portion having a core. A mirror substrate is supported by an end plate formed on one end of the core and a mirror is fixed to the mirror substrate. A supporting portion provided on the other end of said core pivotally supports the core with respect to the up-standing section and a coil portion is wound around the mirror substrate. The movable portion is disposed such that the coil portion of the movable portion is disposed in a magnetic field formed in gaps between the plate member and the other ends of the yokes.

This invention will now be described in detail with respect to the drawings and the description of the preferred embodiment that follows.

BRIEF DESCRIPTION OF THE DRAWINGS

FIG. 12 is a front view of the movable part of the movable mirror device in FIG. 1;

FIG. 13 is a right side view of the movable part in FIG. 12;

FIG. 14 is a rear view of the movable part in FIG. 12; and

FIG. 15 is a cross sectional view of the movable part taken along a line XV—XV in FIG. 12.

DETAILED DESCRIPTION OF THE PREFERRED EMBODIMENT

Figure 1:
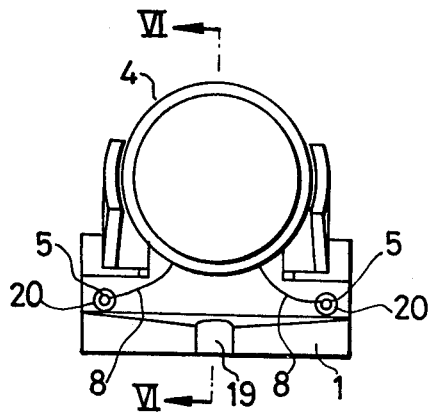
FIG. 1 is a front view of an embodiment of the movable mirror device according to the present invention.

Referring to FIGS. 1 to 15, the movable mirror device according to the present invention comprises, essentially, a base 1, a permanent magnet portion 2, yokes 3, plates 29 and a movable portion 4. Behind the base 1, the permanent magnet portion 2 and a pair of the yokes 3 pinch the permanent magnet portion 2 therebetween are fixedly provided.

The movable portion 4 comprises a mirror portion 6 adhering to a mirror substrate 22 (FIGS. 6, 12) of aluminum, etc. by way of, for example, a bifacial adhesive tape. An annular plate 21, of such as aluminum, surrounds the mirror substrate 22 at the periphery thereof and a coil portion 7 is wound about the annular plate 21. A core portion 12 of an elastic material such as rubber has one end fixedly secured to a rear face of the mirror substrate 22 and a detent portion 11 of such as aluminum is fixedly secured to the core portion 12 at a portion around a free end thereof.

Figure 6:
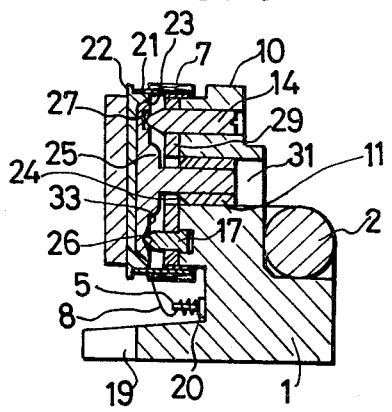
FIG. 6 is a cross sectional view of the movable mirror device taken along a line VI—VI in FIG. 1.

A flat surface 33 of the core portion 12 partially coves the rear face of the mirror substrate 22 so that the rear surface 28 of the substrate 22 is partially exposed (FIGS. 6 and 14). A mortal-shaped recess 26 is formed in a peripheral portion of the flat surface 33 and a radially extending V-shaped groove 27 is formed in the same flat surface at a radially opposite portion to the mortal-shaped recess 26.

As shown in FIGS. 14 and 15, a center land portion 25 is formed on the surface 33. An annular peripheral flange 23 on the rear surface of the mirror substrate 22 and an inner end 24 of the detent 11 have surfaces at an angle of about 45° with respect to the rear surface 33, respectively.

A vertical groove 18 is formed in each side of the rear portion of the base 1 (FIGS. 2, 4 and 10), with a lower end having a lateral hole extending from the front face of the base 1. A flanged electrode 5 in the shape of a rod is inserted into the lateral hole until the flange 20 contacts with the front face of the base 1. Then a portion of the electrode 5 which is exposed is bent at right angle so that the portion fits in the groove 18. The L-shaped electrodes 5 are electrically connected to lead wires 8 of the coil portion 7, respectively.

Figure 2:
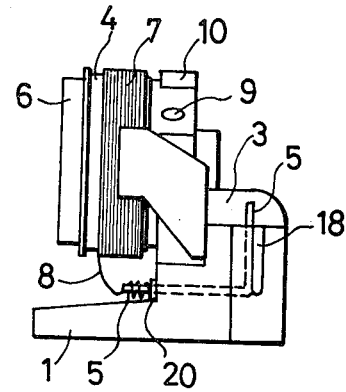
FIG. 2 is a right side view of the movable mirror device in FIG. 1.
Figure 4:
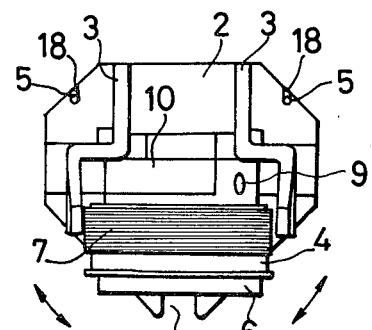
FIG. 4 is a plane view of the movable mirror device in FIG. 1.
Figure 5:
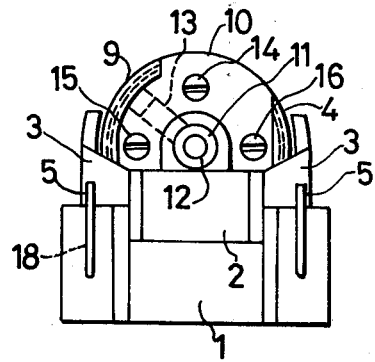
FIG. 5 is a rear view of the movable mirror device in FIG. 1.
Figure 8:
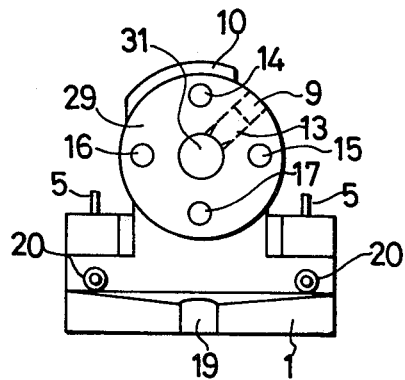
FIG. 8 is a front view of the movable mirror device in FIG. 1 without the movable parts thereof.

The base 1 is formed with an up-standing portion to a front face of which a plate 29 is attached suitably (FIG. 8). The plate 29, together with the yokes 3, form a magnetic circuit including the permanent magnet 2 pinched between the rear end portion of the yokes 3 (FIGS. 2, 4, 5).

Figure 9:
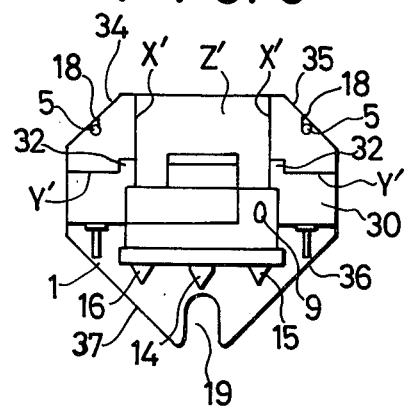
FIG. 9 is a plan view of the movable mirror device in FIG. 8.
Figure 10:
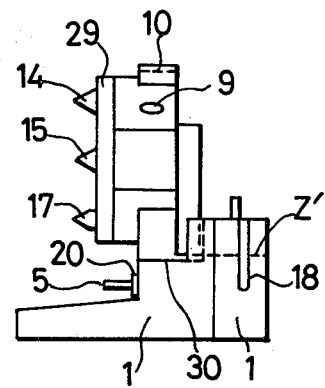
FIG. 10 is a right side view of the movable mirror device in FIG. 8.
Figure 11:
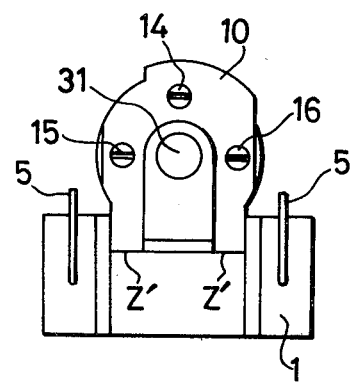
FIG. 11 is a rear view of the movable mirror device in FIG. 8.

The up-standing portion of the base 1 is formed with a center hole 31 extending laterally throughout the up-standing portion (FIGS. 8, 11). The up-standing portion of the base 1 is further formed with a threaded hole 9 which extends to the center hole 31 (FIGS. 8, 9, 10). A screw 13 is inserted into the threaded hole 9 so that the dedent portion 11 of the movable portion 4 inserted into the center hole 31 is engaged with a top of the screw 13 to fix the movable portion 4 at a desired position. (FIGS. 5, 6)

A pointed screw 17 is fixed with respect to the base 1. The pointed screws 14, 15 and 16 are adjustable, as shown in FIG. 6. The top portions of the screws 14 and 17 fit in the V-shaped groove 27 and the conical recess 26, respectively, and define a rotational fulcrum of the movable portion 4. The top portions of the screws 15 and 16 are adapted to contact the rear face 28 of the mirror substrate 22 to limit the rotation of the movable portion 4.

As shown in FIG. 9, the rear portion of the base 1 has three faces X', Y' and Z' orthogonal to each other which are used as contact reference faces with respect to the permanent magnet 2 and the yokes 3. The faces X', Y' and Z' contact with faces X, Y and Z of the yokes 3 (FIG. 7), respectively. At joint portions between the X' faces and the Z' faces of the base 1, recesses 32 are formed respectively, and a predetermined step is formed between the plane 30 and the Z' face of the base 1.

On the upper periphery of the up-standing portion of the base, a projection 10 is formed. The height of the projection 10 is selected so that the outer periphery of the movable portion 4, when attached to the front face of the up-standing portion of the movable portion 4, becomes the same as or higher than the top portion of the coil portion 7 of the movable portion 4.

As shown in FIG. 9, the four corners 34 to 37 of the bottom portion of the base 1 are cutaway to from faces making an angle of 45° with respect to the side faces of the base 1, respectively. A pair of mounting holes 38 and 39 (FIG. 3) are formed in the bottom face of the base 1 and a notch 19 is formed in the front portion of the bottom portion of the base 1.

When a current is supplied from the terminals 5 through the lead-wires 8 to the coil 7, the movable portion 4 rotates about an axis defined by the points of the screws 14 and 17 contacting the bottoms of the V-shaped groove 27 and the conical recess 26, respectively. This rotation is due to an electromagnetic force produced by a magnetic field formed by a combination of the permanent magnetic portion 2, the yokes and the plate 29, and is shown by the arrows in FIG. 4. As a result, it becomes possible to vary the optical direction of a beam reflected by the mirror portion to a desired direction. The range within which the movable portion 4 can rotate is determined by regulating the heights of the points of the screws 15 and 16 which limit the rotation of the movable portion 4 by contacting with the plane 28 of the mirror substrate. When the current through the coil portion 7 terminates, the movable portion 4 returns to the original position by resiliency of the core portion 12.

The movable mirror device according to the present invention is light in weight because the movable portion does not includes the permanent magnet and the distance between the mirror portion and the rotation fulcrum can be minimized. Hence, the movable portion is permitted to follow even a minute change and is not significantly affected by external magnetic fields.

Figure 3:
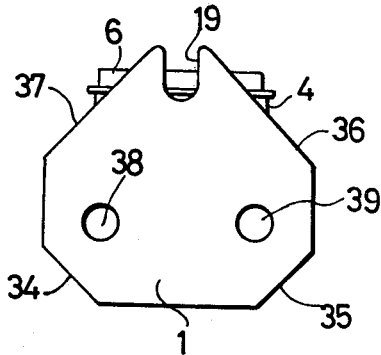
FIG. 3 is a bottom view of the movable mirror device in FIG. 1.

The base 1 may be mounted on a suitable structural portion of an optical imformation recording and reproducing device (not shown) by a boss and notch engagement together with screws. That is, the structural portion (not shown) of the recording and reproducing device may be provided with a boss having a head which is fittable with the notch 19 of the base 1 of the movable mirror device. The structural portion may be provided with a pair of slots the positions and width of which correspond to those of the threads 38 and 39 formed in the base 1 (FIG. 3). The notch 19 and the slots are used to permit a fine position regulation of the movable mirror device with respect to the structural portion of the optical information recording and reproducing device.

Since the base portion 1 has the three faces X', Y' and Z' which are orthogonal to each other, it is possible to exactly fix the permanent magnet portion 2 and the yokes 3 by, for example, an adhesive, without using a jig.

Figure 7:
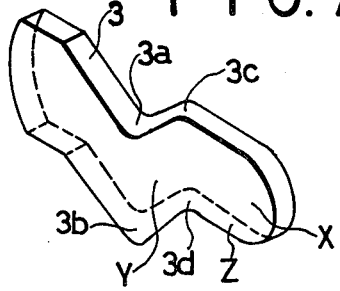
FIG. 7 is a perspective view of a yoke of the movable mirror device in FIG. 1.

One of the yokes 3 may be formed as shown in FIG. 7 and the other yoke 3 has a configuration symmetrical to the one shown in FIG. 7. With the shape of the yokes 3 shown in FIG. 7, the bent portions 3a to 3d may protrude from a reference plane. The recesses 32 formed at the adjoining portion of the X' and Y' planes and the stepped portion between the Z' plane and the plane 30 facilitate the fixing of the yokes 3 regardless of the protruded bent portions.

The movements of the terminals 5 are prevented due to the L-shapes thereof which fit in the lateral holes and the grooves 18 formed in the base 1. Therefore, there is no problem of breaking down the lead-wires 8 of the coil portion 7 after being soldered to the terminals 5.

Although the coil portion 7 is exposed in this embodiment, there is no condition where an accidental grasp of the coil portion 7 will damage it. This is because, since the level of the protrusion 10, when the movable portion 4 is assembled to the base 1, is substantially the same as or slightly higher than the level of the uppermost portion of the coil portion 7, one can hold the movable mirror device between the protrusion 10 and the bottom of the base 1. Furthermore, the movable mirror device of the present invention may be mounted in a relatively narrow space due to the cut corners 34 to 37 of the base 1 thereof.

As previously mentioned, the external magnetic fields hardly affect the movable mirror device having the described structure. Therefore, it is unnecessary to regulate the position of the mirror portion in the horizontal direction. It is enough to regulate the vertical position thereof. As a result, the regulation can be easily performed by using only two screws 14 and 17. Since one (17) of the two screws is fixed on the base 1, the regulation can be performed by only one screw 14. Furthermore, since, as mentioned above, the rotation fulcrum is defined by the regulation screws 14 and 17, there is no need to provide a separate rotation fulcrum. With the rotation fulcrum defined by the points of the screws 14 and 17, it is possible to have it coincide with the recess and groove 26 and 27. Even if the distance between the points of the screws 14 and 17 fluctuates due to some problems in manufacture, the V groove 27 can compensate for the fluctuation.

The land portion 33 may be made of a material such as rubber. Since the rotation fulcrum is defined by the contacts of the points of the screws 14 and 17, metal with the recess 26 and groove 27 formed in the rubber land portion and the regulation of the rotation is obtained by the contacts of the rear surface 28 of the metal substrate 22 with the points of the screws 15 and 16 of metal, there is no problem of resonance oscillation of the rotation fulcrum system and lack of positive of the rotation limits.

The returning force of the movable portion is sufficient because it is possible to position the bending point of the core 12 rearwardly since the land 25 protrudes from the plane 33 of the core portion 12.

The peripheral flange 23 of the mirror substrate 22 constitutes a reinforcement and results in a reduction of weight of the substrate 22. Further, with the angles of the flange and the end portion of the detent portion 11 being 45°, respectively, it may be possible to form the core 12 by injecting rubber into a mold die placed between the detent and the mirror substrate 22. This may result in an exact definition of the positional relation between the detent 11 and the substrate 22.

It is apparent that modifications of this invention are possible without departing from the essential scope thereof.

What is claimed is:

1. A movable mirror device for an optical information recording and reproducing system comprising, a base portion having a bottom section and an upstanding section extending from said bottom section, said upstanding section having an opening therein adapted to receive a core member, a permanent magnet having opposite magnetic poles at opposite ends thereof and fixedly mounted on said bottom section of said base portion, a pair of yokes each having one end engaged with said opposite ends of said magnet, respectively, a plate member supported by said upstanding section of said base portion and being positioned between the other ends of said yokes, and a movable portion having a core, a mirror substrate supported by an end plate formed on one end of said core, a mirror fixed to said mirror substrate, a supporting portion provided on the other end of said core for pivotally supporting said core in said opening in said up-standing section and, a coil portion wound around said mirror substrate, said movable portion being disposed such that said coil portion of said movable portion is positioned in a magnetic field formed in gaps between said plate member and the other ends of said yokes.

2. A movable mirror device as in claim 1, wherein said one end of said core comprises a portion of increased thickness connecting said end plate.

3. A movable mirror device as in claim 1, wherein said up-standing section of said base portion is formed with a portion protruding from said coil portion.

4. A movable mirror device as in claim 1, 2 or 3, wherein said base portion has three reference planes, said reference planes being orthogonal to each other, and wherein each of said yokes has three reference planes, said reference planes of said yokes being orthogonal to each other and contacting with said reference planes of said base portion, respectively.

5. A movable mirror device as in claim 4, wherein said reference planes of said base portion have notches for receiving said yokes.

6. A movable mirror device as in claim 1, 2 or 3, wherein said up-standing section of said base portion has at least a first pair of vertically arranged, pointed screws each protruding forwardly of a front face of said up-standing section, and wherein said end plate of said core is provided with recesses at corresponding positions to the points of said screws, said points of said first pair of screws in pivotal contact with said recesses of said end plate of said core.

7. A movable mirror device as in claim 6, wherein one of said recesses formed in said end plate of said core is in the shape of V groove extending along a line connecting said recesses.

8. A movable mirror device as in claim 6 wherein said pivotable contact between said points of said screws and said recesses defines a fulcrum line for rotation of said mirror supported by said end plate of said core, whereby a vertical angle of said mirror is regulated by regulating at least one of said screws.

9. A movable mirror device as in claim 8, wherein one of said screws is fixedly provided with respect to said base portion.

10. A movable mirror device as in claims 1, 2 or 3, wherein said mirror substrate is metal and said core is a resilient material.

11. A movable mirror device as in claim 6, wherein said up-standing section of said base portion further comprises at least a second pair of horizontally arranged, pointed screws, each protruding forwardly of said front face of said up-standing section, the points of said second pair of screws being adapted to contact said mirror substrate to limit a rotation of said mirror substrate about said line connecting said first screws.

12. A movable mirror device as in claim 1, wherein said base portion has grooves for fillingly receiving electrode members connected to said coil portion.

13. A movable mirror device as in claim 1, wherein said bottom section of said base portion is provided at a front end portion with a notch and in a lower face thereof with a pair of thread holes.

14. A movable mirror device as in claim 13, wherein four corners of said bottom section of said base portion are cut at an angle of 45°, respectively.

15. A movable mirror device as in claim 13, wherein said mirror substrate is provided with a peripheral flange protruding backwardly thereof, an inner wall of said flange being sloped at an angle of 45°, and wherein an inner end of said supporting portion of said core is sloped at an angle of 45°.

* * * * *